(12) United States Patent
Tabrizi

(10) Patent No.: US 9,067,616 B1
(45) Date of Patent: Jun. 30, 2015

(54) WHEELBARROW DRAINAGE SYSTEM

(71) Applicant: Behnam Tabrizi, San Diego, CA (US)

(72) Inventor: Behnam Tabrizi, San Diego, CA (US)

(*) Notice: Subject to any disclaimer, the term of this patent is extended or adjusted under 35 U.S.C. 154(b) by 0 days.

(21) Appl. No.: 14/176,277

(22) Filed: Feb. 10, 2014

Related U.S. Application Data

(63) Continuation-in-part of application No. 14/101,344, filed on Dec. 10, 2013.

(51) Int. Cl.
*B62B 1/18* (2006.01)
*B62B 1/20* (2006.01)

(52) U.S. Cl.
CPC ..................................... *B62B 1/204* (2013.01)

(58) Field of Classification Search
CPC ............. B62B 1/00; B62B 1/10; B62B 1/12; B62B 1/14; B62B 1/18; B62B 1/20; B62B 1/22
USPC ................. 280/652, 654, 655, 47.131, 47.17, 280/47.18, 47.3, 47.31, 78, 79.2
See application file for complete search history.

(56) References Cited

U.S. PATENT DOCUMENTS

| | | | | |
|---|---|---|---|---|
| 2,437,968 | A * | 3/1948 | Palotsee | 68/148 |
| 5,016,296 | A * | 5/1991 | Beaumont | 4/507 |
| 7,203,994 | B2 * | 4/2007 | Smith | 15/409 |
| 8,651,341 | B1 * | 2/2014 | Luther | 222/609 |

* cited by examiner

*Primary Examiner* — John Walters
(74) *Attorney, Agent, or Firm* — John R. Ross; John R. Ross, III

(57) ABSTRACT

A wheelbarrow with a drainage system. A drainage hole is drilled into the wheelbarrow tray. A flange is positioned over the predrilled hole. The flange has a contoured track and a flange opening. An elbow is positioned under the predrilled hole and is connected to the flange. The elbow has a ball bearing connected to the elbow and inserted into the contoured track. A removable drain plug is connected to the elbow and plugs the flange opening when the drainage system is in the closed position and unplugs the flange opening when the drainage system is in an open position. The drainage system is moved from the closed position to the open position by turning the elbow. The ball bearing then moves along the contoured track and causes the drain plug to move between plugging and then unplugging the flange opening.

9 Claims, 21 Drawing Sheets

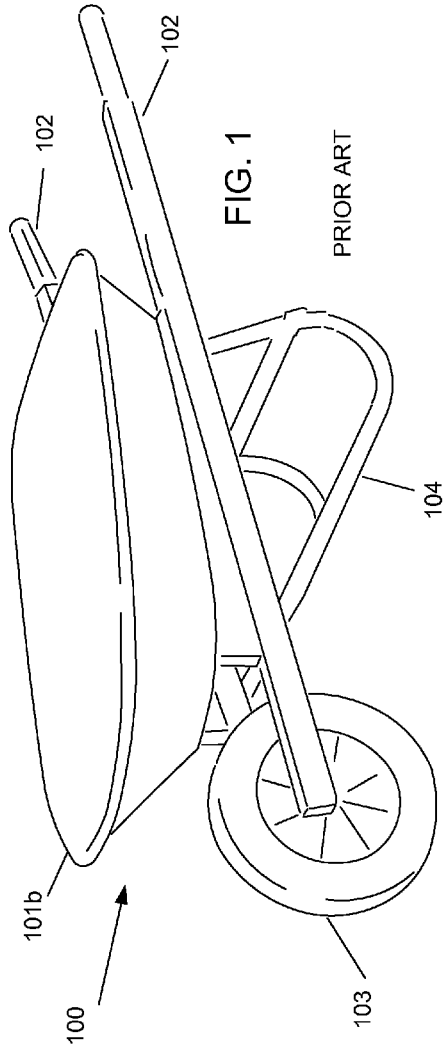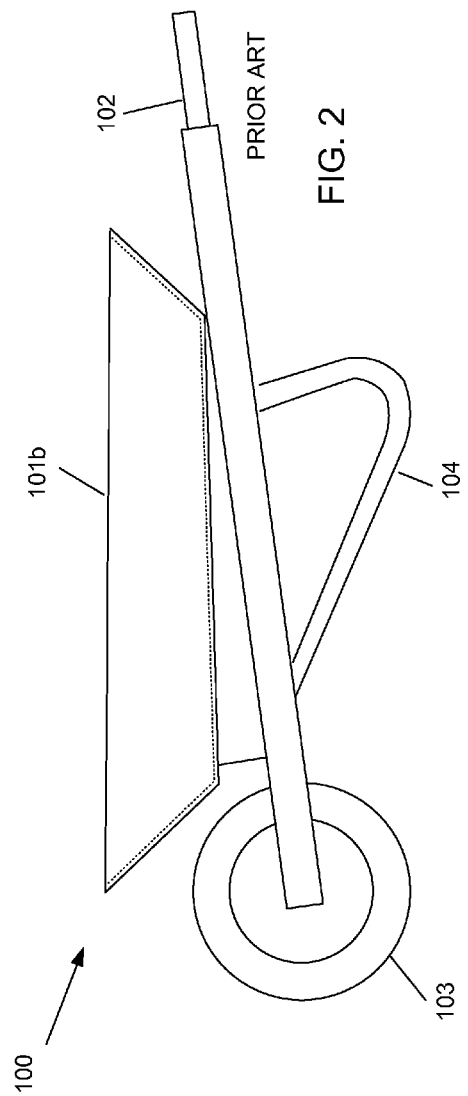

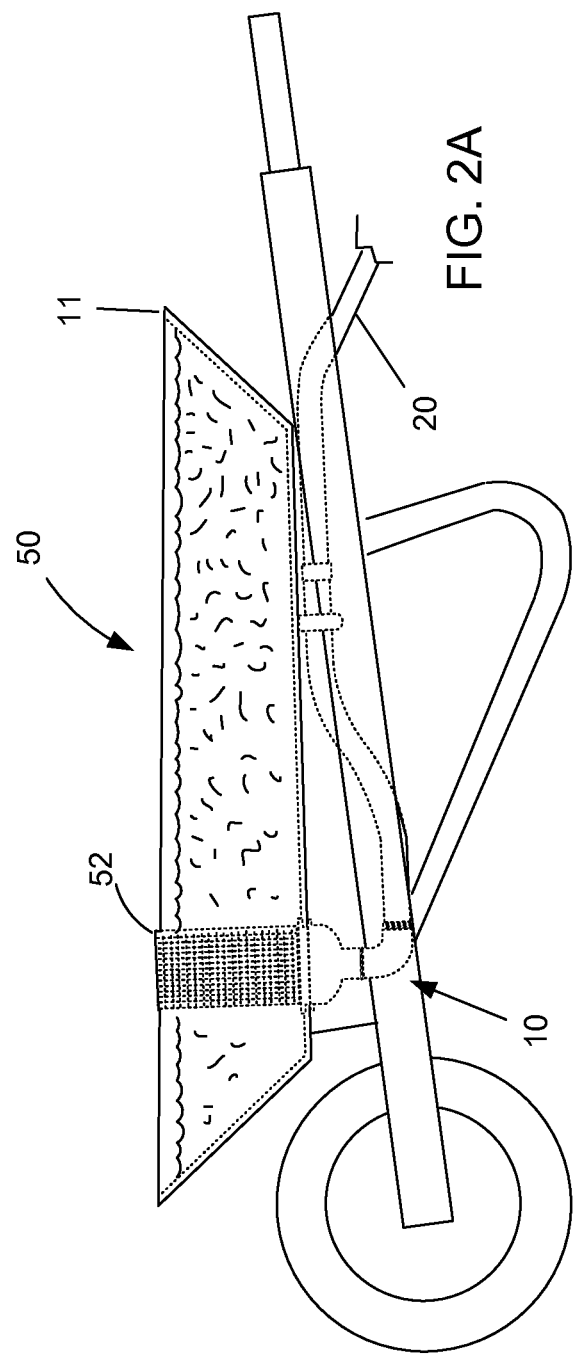

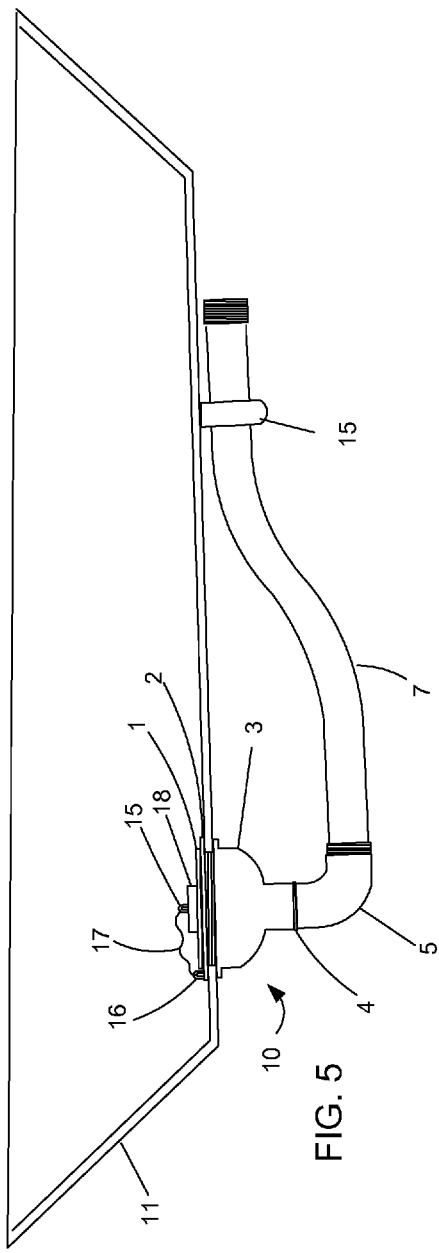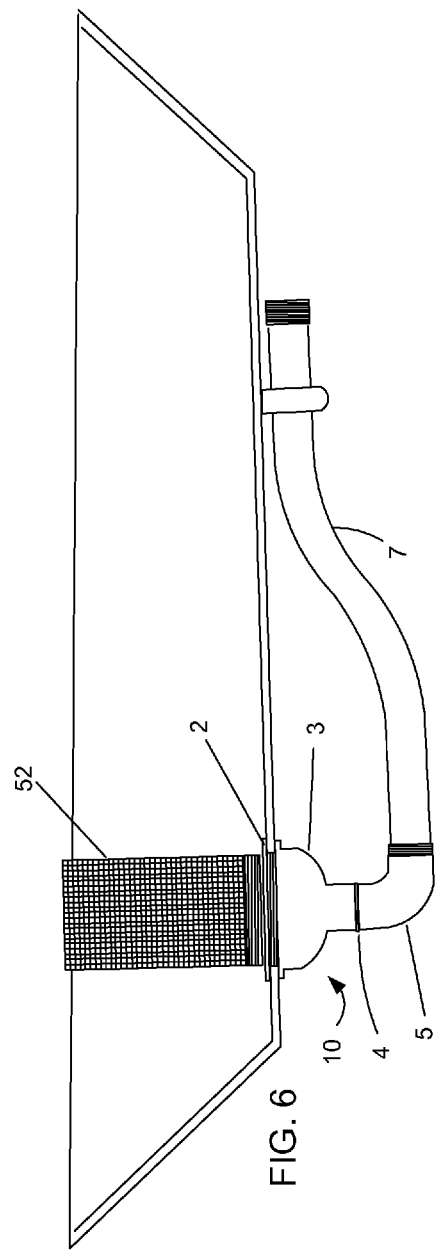

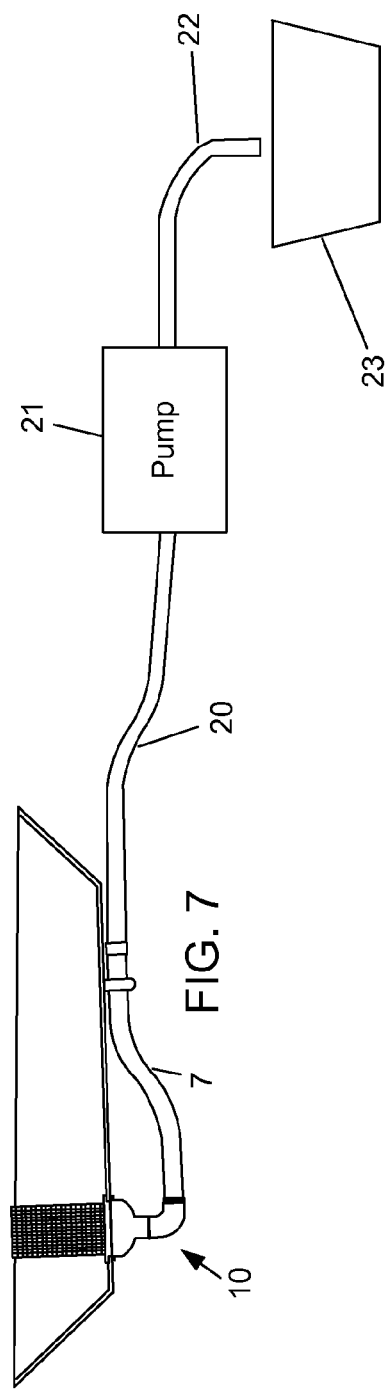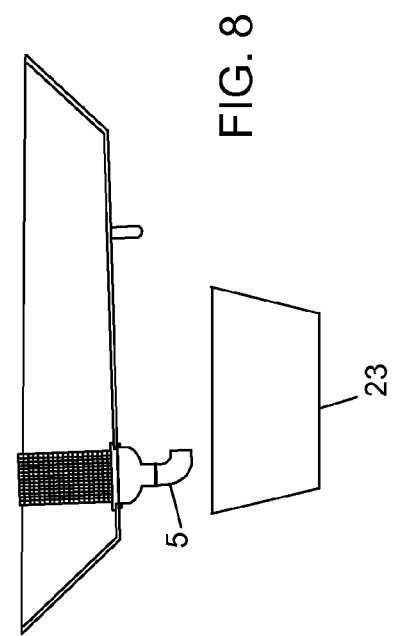

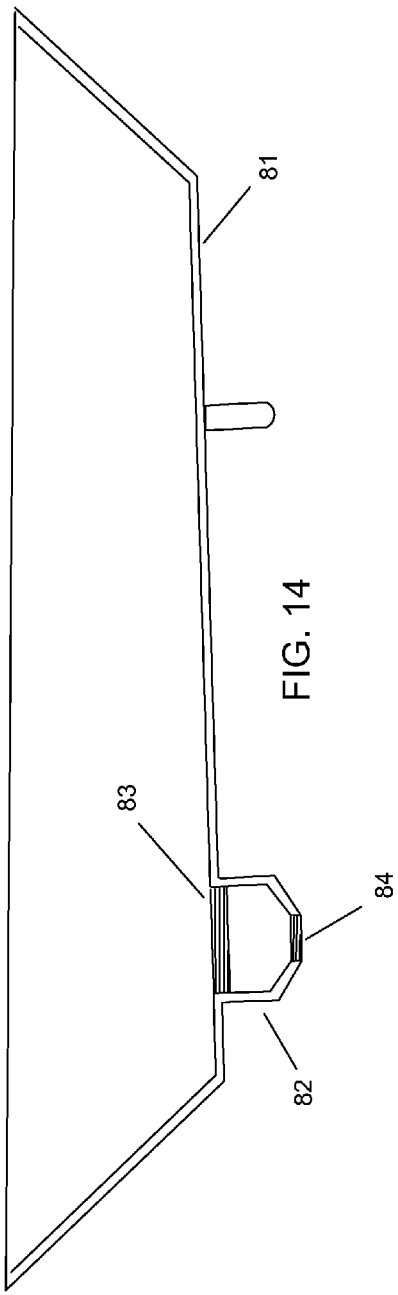
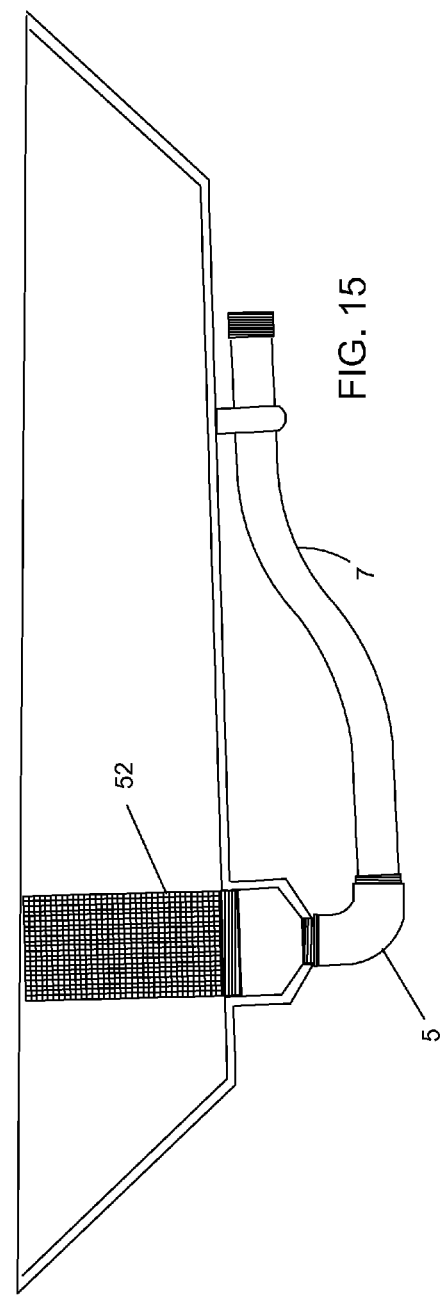

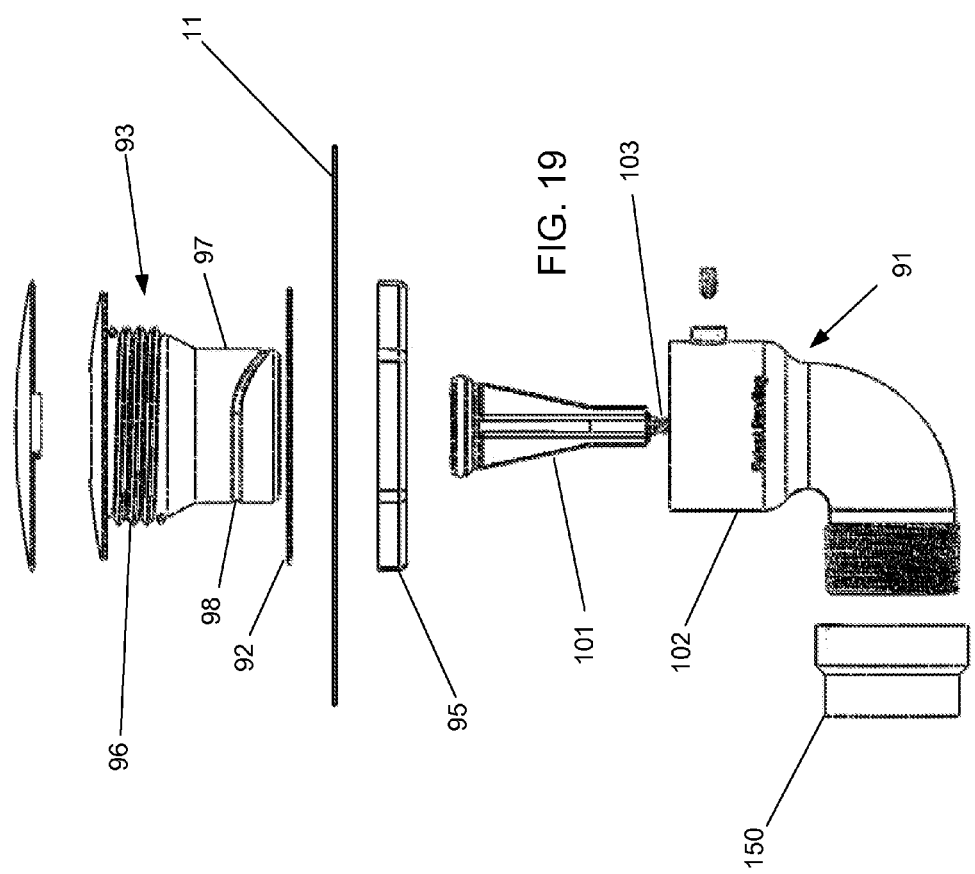

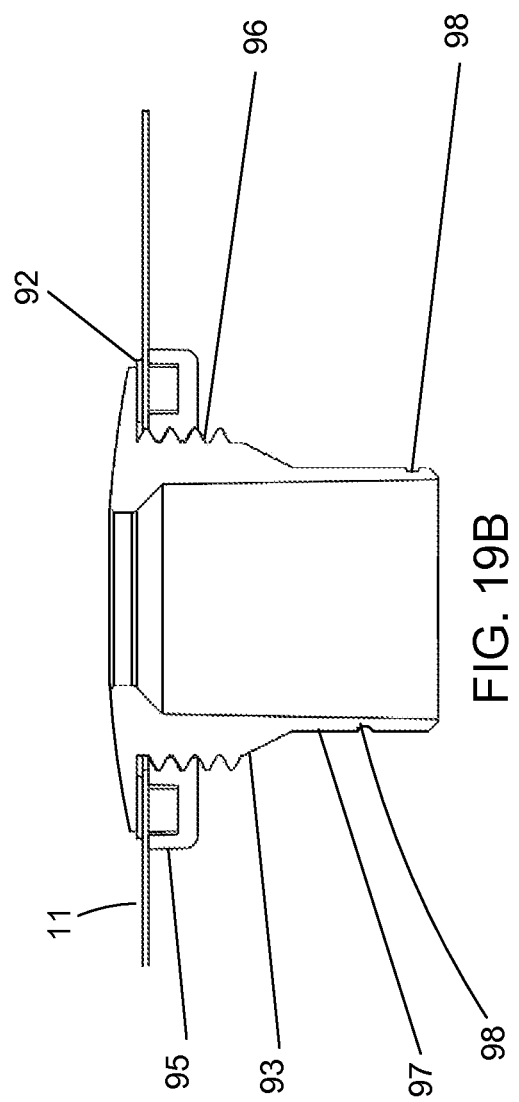

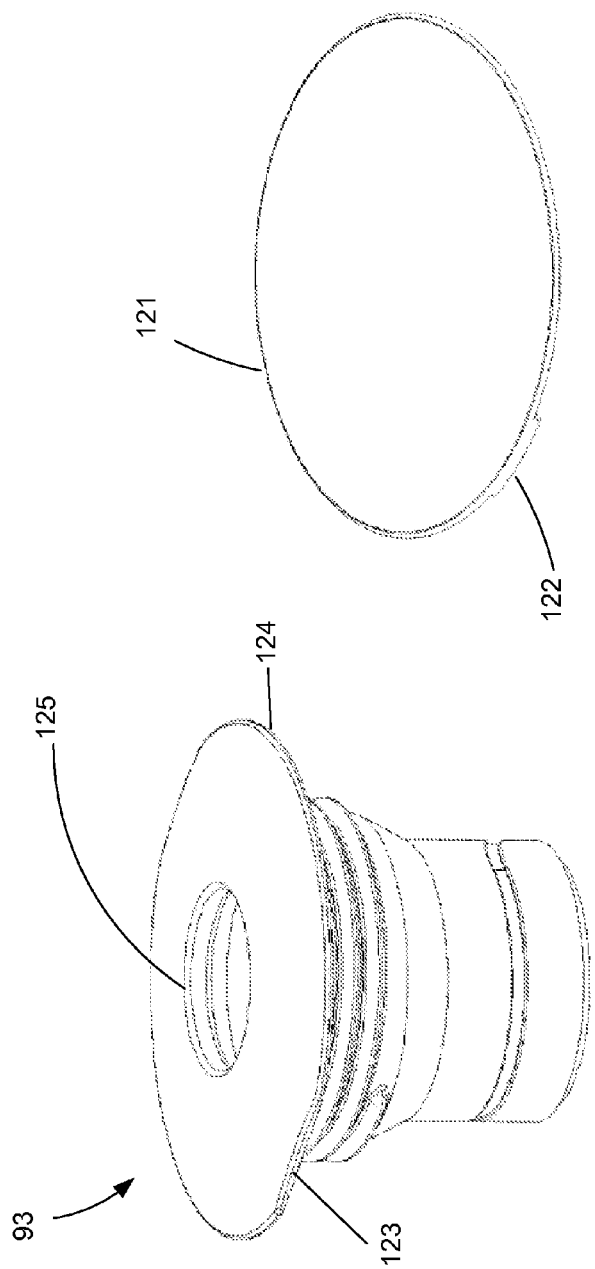
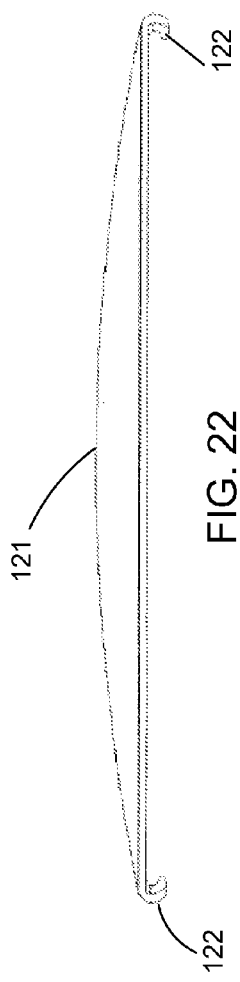

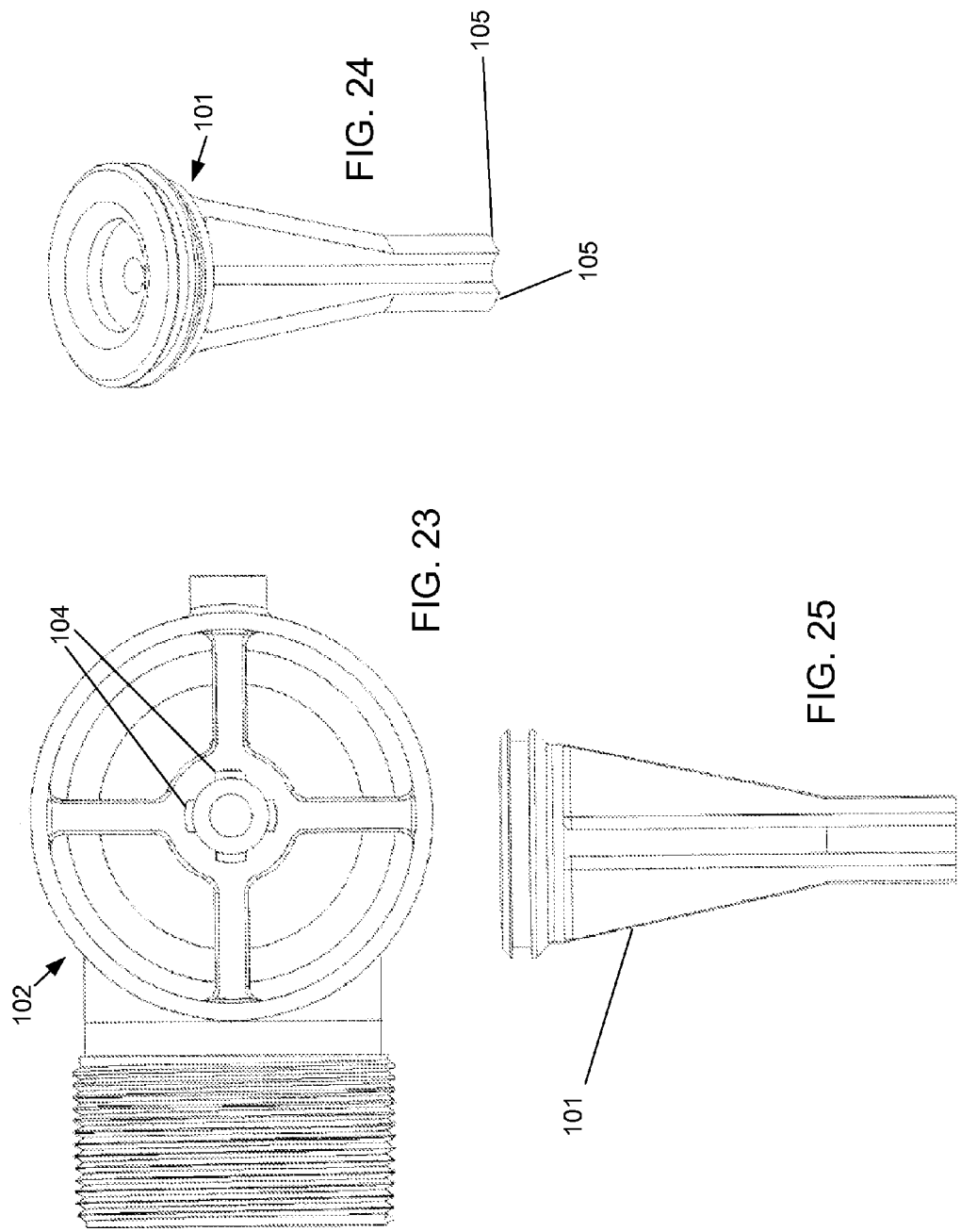

WHEELBARROW DRAINAGE SYSTEM

The present invention relates to wheelbarrows, and in particular, to drainage systems for wheelbarrows. This application is a continuation-in-part of U.S. patent application Ser. No. 14/101,344, filed Dec. 10, 2013, which is incorporated by reference herein.

BACKGROUND OF THE INVENTION

Wheelbarrows are well known. FIGS. 1-2 show prior art wheelbarrow 100. Wheelbarrow 100 includes tray 101b, handles 102, wheel 103 and braces 104. The user of wheelbarrow 100 can place objects, materials and fluids inside tray 101b and move the wheelbarrow by grabbing the handles and walking.

Also, wheelbarrow 100 can be rolled to a work site. During the course of usage fluids and other materials may start to fill tray 101b. At one point it will become important to remove the fluid from the wheelbarrow.

Fluid removal from the tray of a wheelbarrow can be a problem for workers. Often the fluid is contaminated and it is not acceptable just to dump the fluid on the ground. Instead workers are forced to scoop the fluid out with a bucket or roll the wheelbarrow to an appropriate dump area where the contaminated fluid can be dumped. Both of these methods are cumbersome and time consuming and result in decreased productivity for the worker.

What is needed is an effective drainage system for a wheelbarrow.

SUMMARY OF THE INVENTION

The present invention provides a wheelbarrow with a drainage system. A drainage hole is drilled into the wheelbarrow tray. A flange is positioned over the predrilled hole. The flange has a contoured track and a flange opening. An elbow is positioned under the predrilled hole and is connected to the flange. The elbow has a ball bearing connected to the elbow and inserted into the contoured track. A removable drain plug is connected to the elbow and plugs the flange opening when the drainage system is in the closed position and unplugs the flange opening when the drainage system is in an open position. The drainage system is moved from the closed position to the open position by turning the elbow. The ball bearing then moves along the contoured track and causes the drain plug to move between plugging and then unplugging the flange opening.

BRIEF DESCRIPTION OF THE DRAWINGS

FIGS. 1-2 show a prior art wheelbarrow.
FIG. 2A shows a wheelbarrow utilizing a preferred drainage system.
FIG. 5 illustrates the utilization of a preferred cap.
FIG. 6 illustrates the utilization of a preferred filter.
FIG. 7 shows the utilization of a pump to pump fluid to a receptacle.
FIG. 8 shows the utilization of gravity to receive fluid from the wheelbarrow tray.
FIGS. 14-15 show another preferred embodiment of the present invention.
FIGS. 16-30 show another preferred embodiment of the present invention.

DETAILED DESCRIPTION OF THE PREFERRED EMBODIMENTS

FIG. 2A shows a preferred wheelbarrow drainage system 10 connected to wheelbarrow 50. Drainage system 10 drains fluid from tray 51 through a predrilled hole in the bottom of tray 51. Filter 52 prevents debris from flowing through the drain. Hose 20 allows for the drained fluid to be transferred to an appropriate location for disposal. By utilization of wheelbarrow drainage system 10 the user can quickly and efficiently dispose of fluid in a safe and acceptable disposal receptacle.

Figure 3:
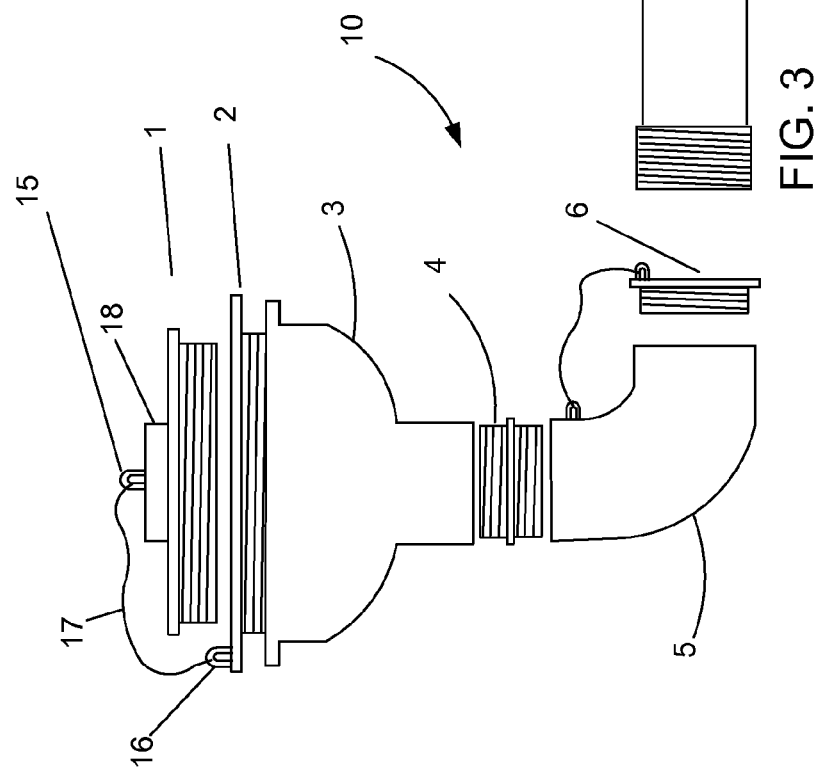
FIG. 3 shows a preferred drainage system
Figure 9:
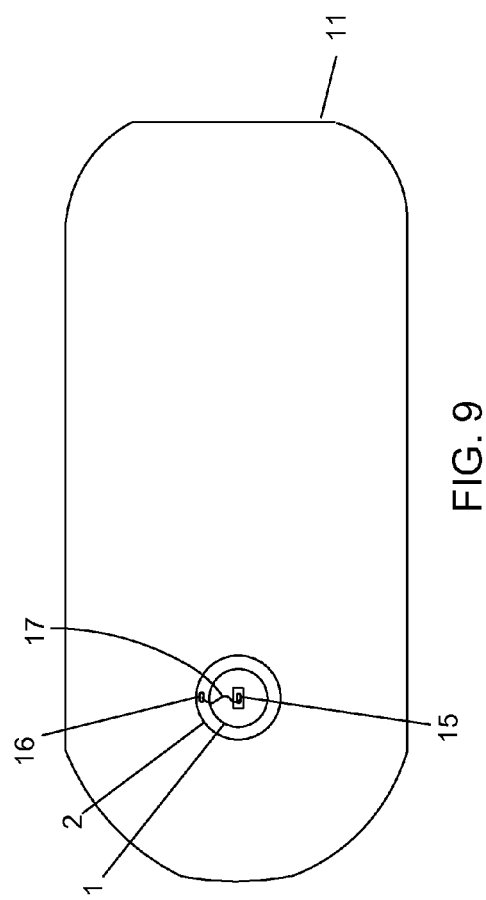
FIG. 9 shows a top view of a preferred tray.

FIG. 3 shows an exploded view of a preferred wheelbarrow drainage system 10 and FIG. 5 shows wheelbarrow drainage system 10 attached to tray 11. When wheelbarrow 50 is not being used to drain fluid, cap 1 is threaded on to internal threads of flange 2. Cap 1 prevents unwanted material from entering drainage system 10. Cap 1 preferably includes chain attachment hook 15 and knob 18. The user turns know 18 to screw cap 1 onto and of the internal threads of flange 2. Tray chain attachment hook 16 is rigidly connected to flange 2. Chain 17 is connected between hook 15 and hook 16 and functions to hold cap 1 within tray 11 when cap 1 is not threaded onto flange 2 (FIG. 9).

Figure 10:
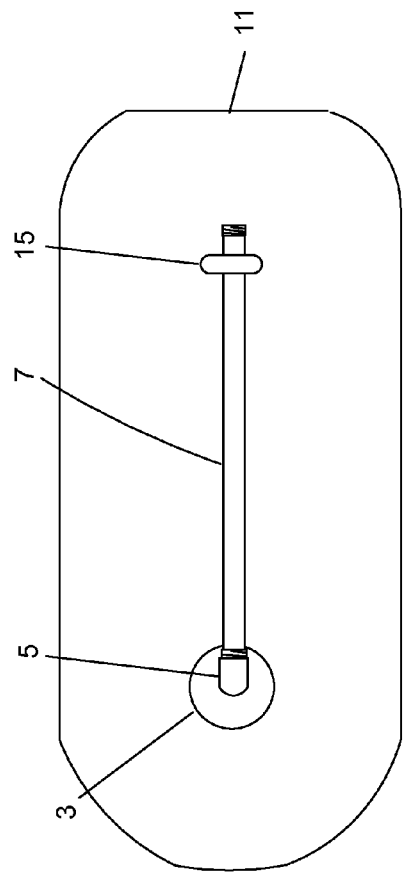
FIG. 10 shows a bottom view of a preferred tray.

Flange 2 functions to hold basket 3 tightly against the underside of tray 11 (FIG. 5, FIG. 10). Flange 2 is inserted through a predrilled hole in tray 11 and is threaded onto the internal threads of basket 3. Basket 3 is threaded onto bearing 4. Bearing 4 is threaded onto elbow 5 and allows for 360 degree rotation of elbow 5. Elbow 5 includes cap 6 which may be attached via threads when drainage system 10 is not in use. As shown in FIG. 5, flexible hose 7 is threaded onto elbow 5. Flexible hose 7 is supported by bracket 15. Cap 1, flange 2, basket 3, bearing 4 and elbow 5 are preferably fabricated from polyvinyl chloride (PVC), however other strong materials may also be used.

Figure 4:
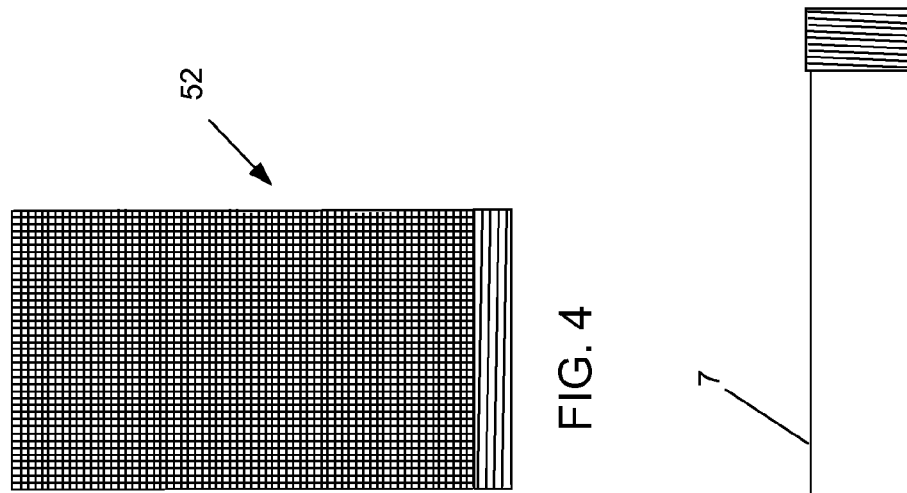
FIG. 4 shows a preferred filter.

FIG. 6 depicts details of a preferred method of using drainage system 10 similar to the arrangement shown in FIG. 2A. When the user is ready to drain fluid from the wheelbarrow, he will remove cap 1 and instead thread filter 52 (FIG. 4) onto the internal threads of flange 2. Filter 52 is preferably a circular wire mesh filter that will allow flow of fluid into drainage system 10 and prevent the entry of unwanted debris.

FIG. 7 illustrates a preferred method for utilizing drainage system 10. Extension hose 20 is threaded onto hose 7 and is connected to pump 21. Pump discharge hose 22 is connected to pump 21 and discharges into receptacle 23. The arrangement shown in FIG. 7 allows the user to pump fluid from tray 11 to a desired location for proper disposal.

FIG. 8 illustrates another preferred method for utilizing drainage system 10. In FIG. 8 the user does not need to pump the fluid from tray 11 to a remote location for disposal. Instead the user may just place receptacle 23 directly under elbow 5 and allow gravity to drain the fluid into the receptacle 23.

Figure 11:
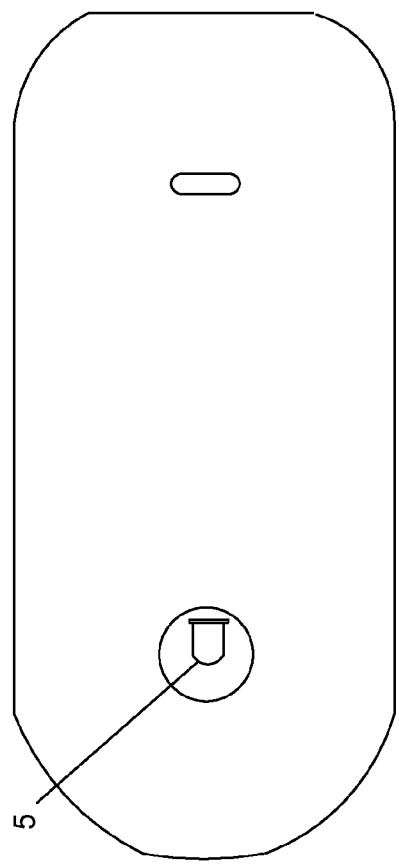
FIGS. 11-12 show the rotation of preferred elbow.
Figure 12:
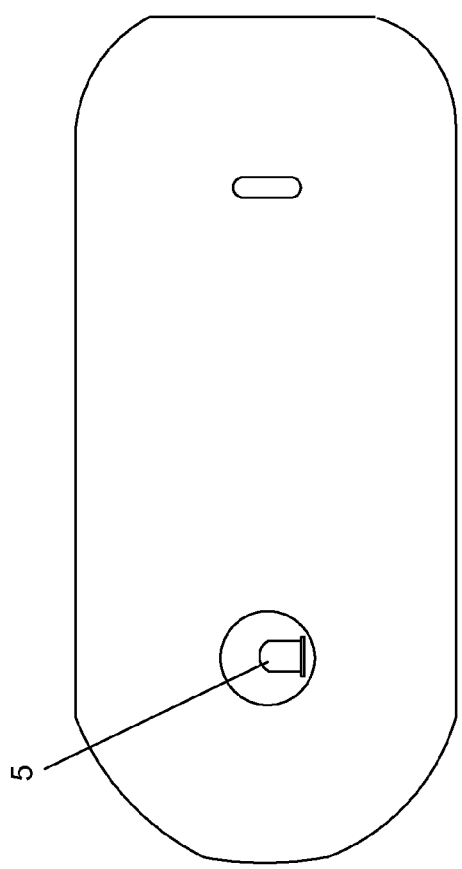

FIGS. 11 and 12 illustrate the rotation of elbow 5, as discussed above in reference to FIG. 5. For example the user may want to direct the flow of fluid leaving elbow 5 in a variety of directions. In FIG. 11 the flow is being directed rearward. In FIG. 12 the user has rotated elbow 5 to a different direction.

Figure 13:
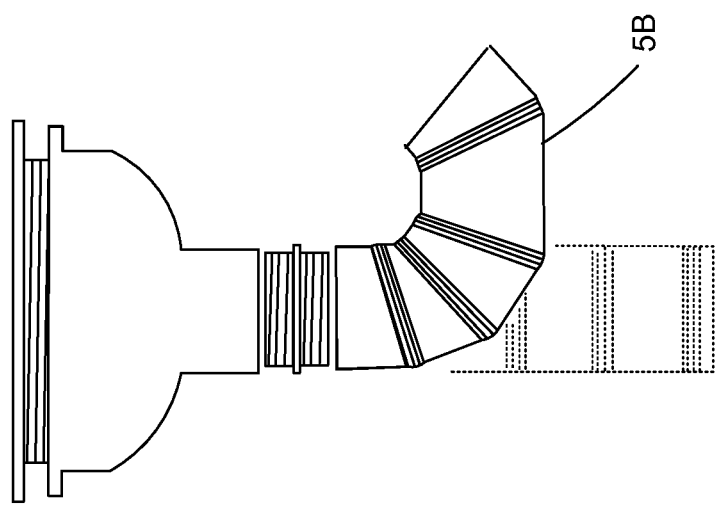
FIG. 13 shows a preferred angle adjustable elbow.

In FIG. 13 the user has replaced elbow 5 with angle adjustable elbow 5B. Elbow can be bent and pivoted to adjust the angle of the fluid flow leaving elbow 5B to accommodate the preferences of the user.

FIGS. 14-15 show another preferred embodiment of the present invention. Tray 81 has been fabricated from molded hard plastic. Basket 82 is molded onto the bottom of tray 81 and includes upper threaded opening 83 and lower threaded opening 84. In FIG. 15 filter 52 has been threaded onto upper threaded opening 83 and elbow 5 has been threaded onto lower threaded opening 84. Flexible hose 7 has been connected to elbow 5.

Other Preferred Embodiment

Figure 16:
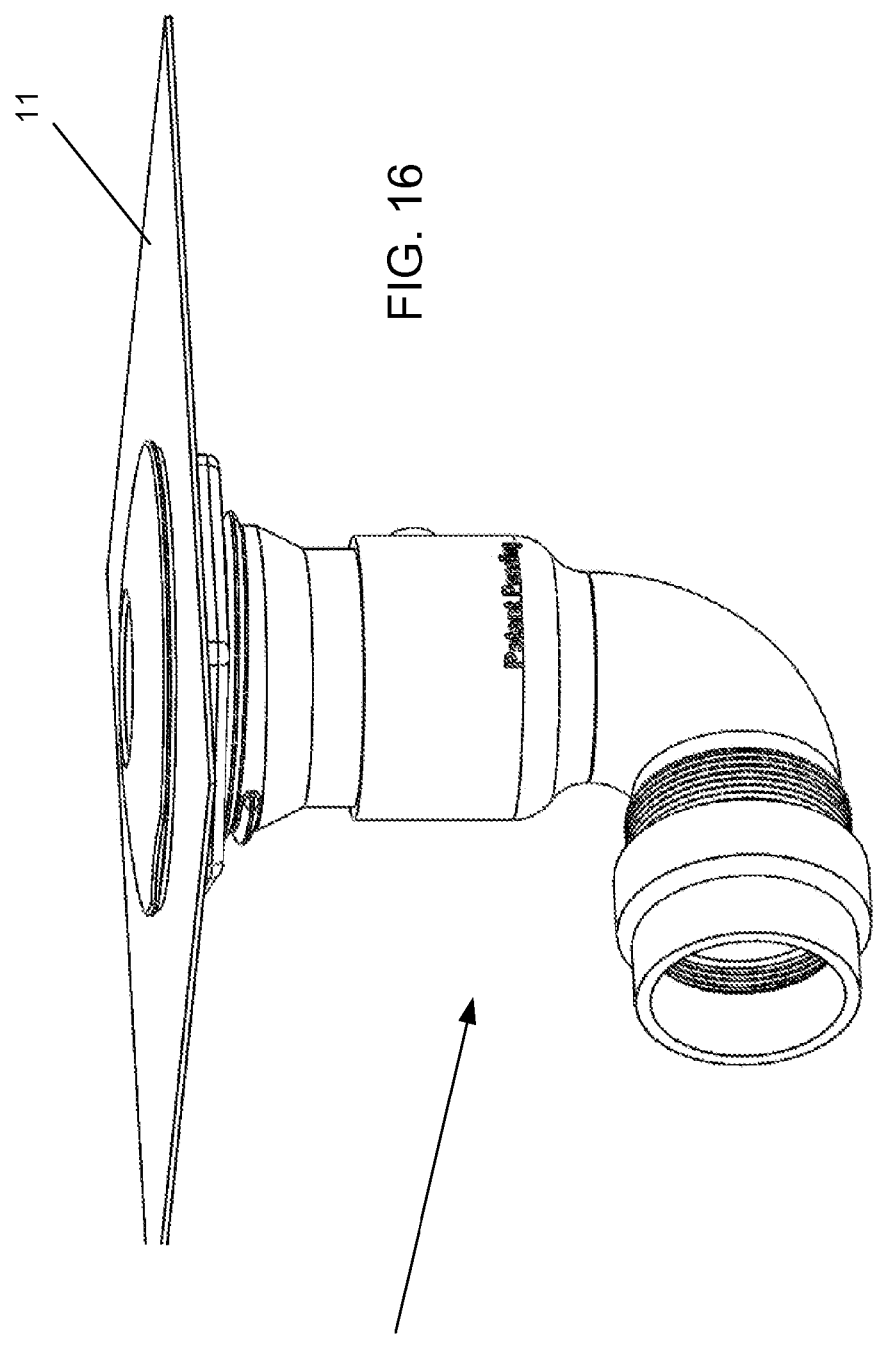
Figure 17:
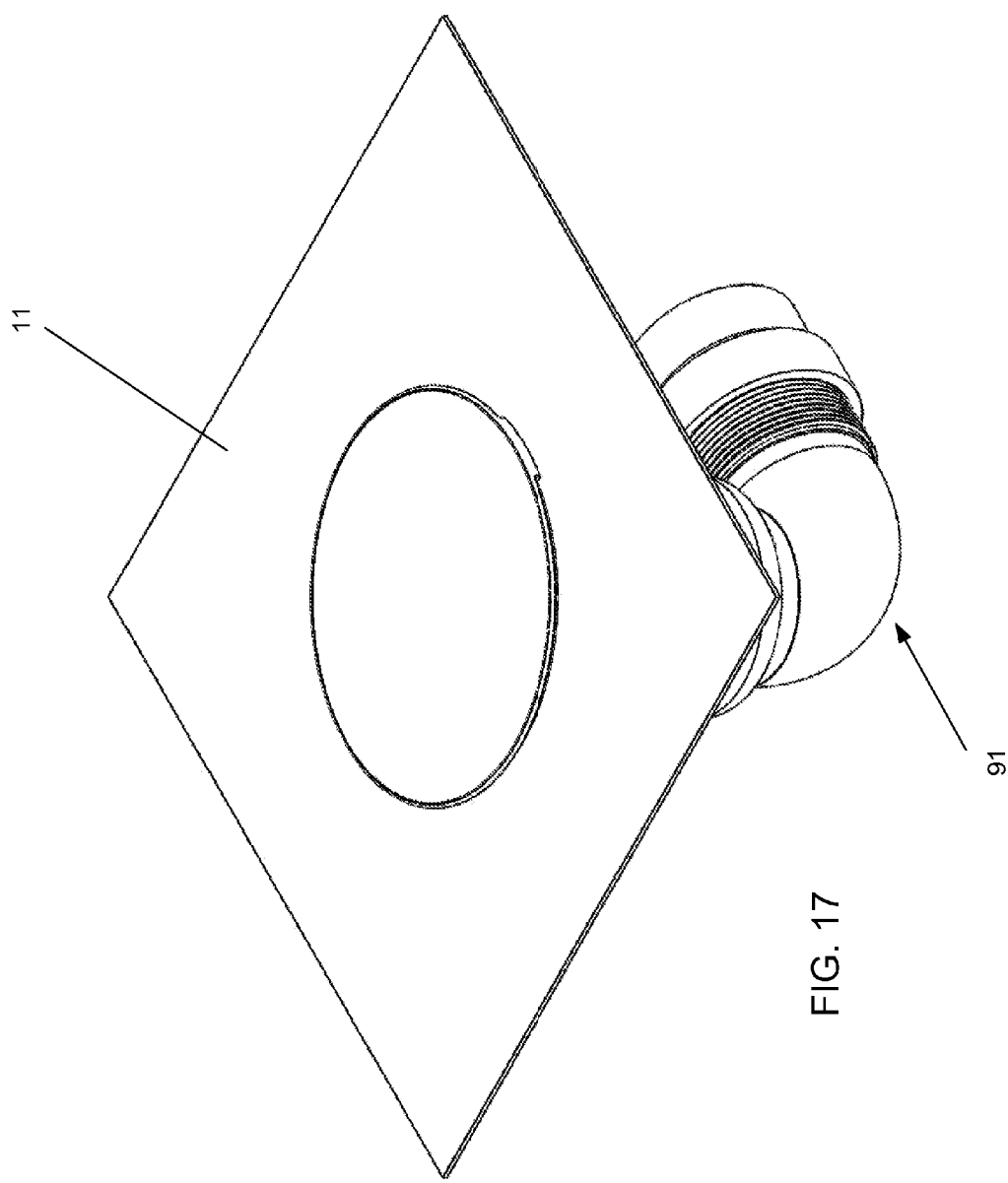
Figure 18:
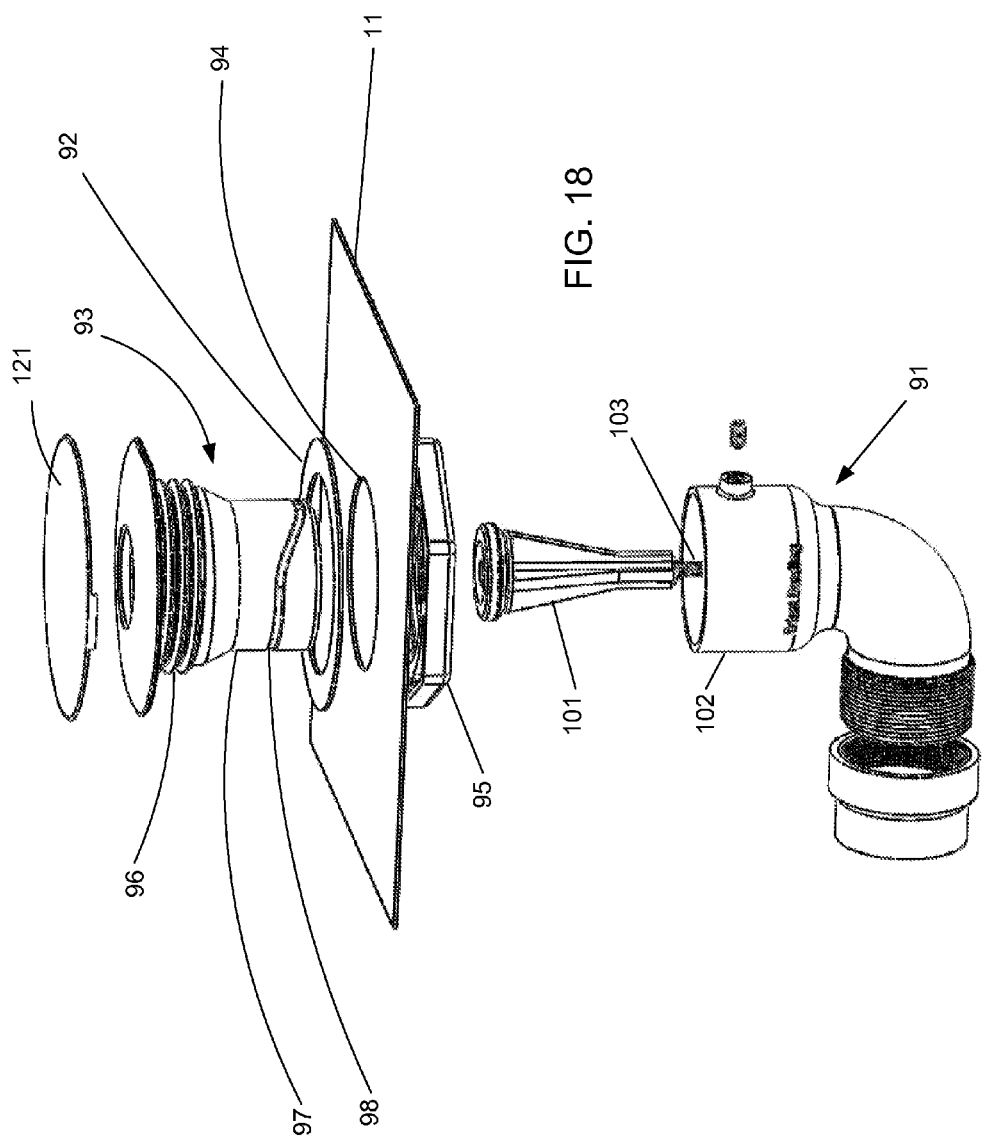

FIGS. 16-28 show another preferred embodiment of the present invention. Drainage system 91 is attaches to tray 11 of the wheelbarrow (FIGS. 16-17). FIG. 18 shows a perspective exploded view of drainage system 91 and FIG. 19 shows a perspective side view of drainage system 91.

To install drainage system 91, rubber gasket 92 is placed over pre-drilled hole 94 in tray 11 (see also FIG. 19B). Flange 93 is then inserted through gasket 92 and hole 94. Flange nut 95 is then threaded tightly onto threads 96 of flange 93 to hold flange 93 tightly in place. Flange 93 includes lower section 97 having contoured track 98.

Figure 19C:
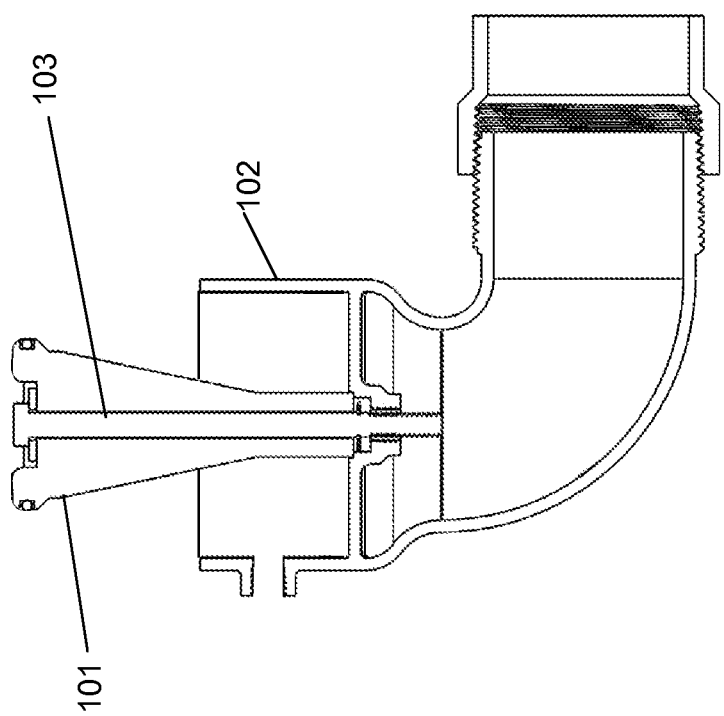

Using bolt 103, drain plug 101 is then bolted onto elbow 102 so that it is held rigidly in place (see also FIG. 19C). FIG. 23 shows a top view of elbow 102. FIG. 24 shows a perspective view of drain plug 101 and FIG. 25 shows a side view of drain plug 101. Preferably, elbow 102 includes indentions 104 (FIG. 23). Indentions 104 are spaced to correspond with extensions 105 of drain plug 101 to better stabilize drain plug 101 when it is bolted to elbow 102. Elbow cap 150 is connected to elbow 102 and is utilized for connecting a flexible hose.

Figure 26:
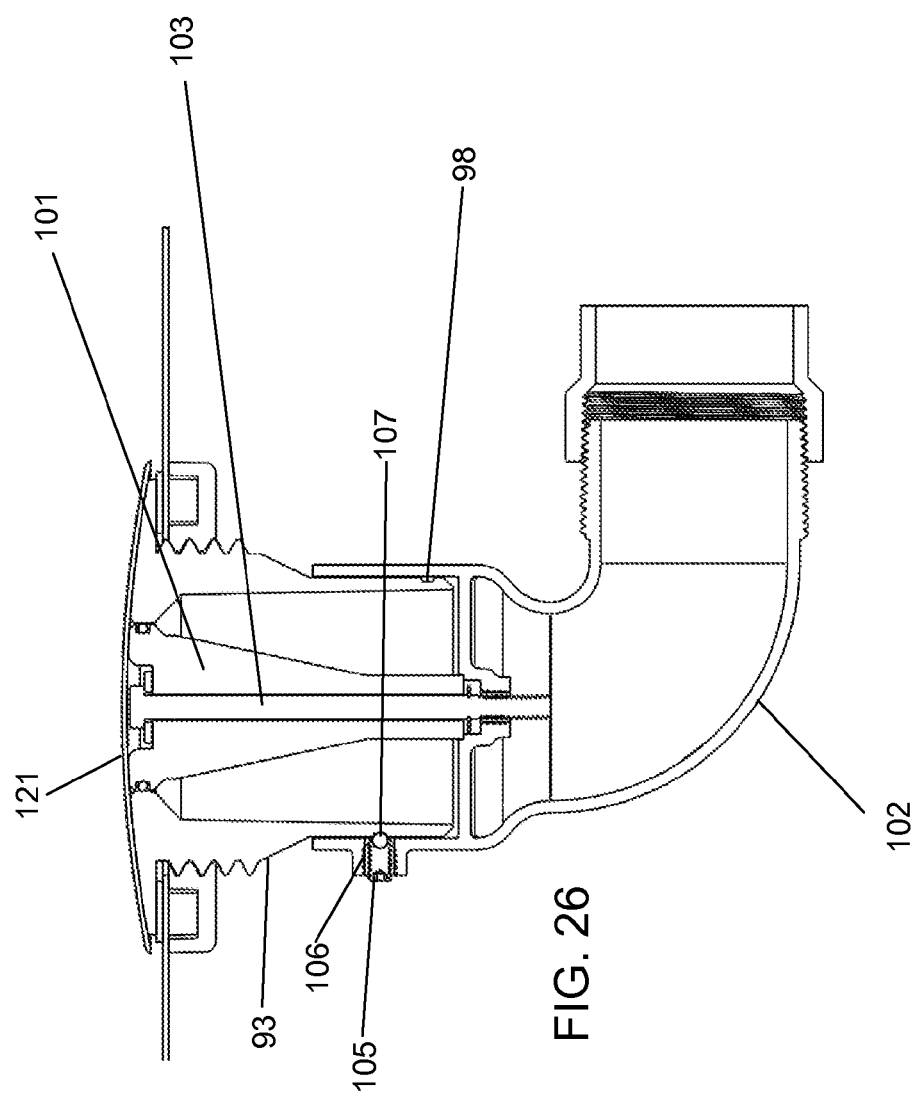

After drain plug 101 has been bolted to elbow 102, elbow 102 can then be attached to flange 93 (FIG. 26). To make the attachment, elbow 102 is pushed upward and inserted over and around flange 93. Threaded allen set screw 105 is threaded onto threaded hole 106 of elbow 102. Screw 105 includes ball bearing 107. Ball bearing 107 aligns with contoured track 98 of flange 93 and holds elbow 102 in place.

Figure 28:
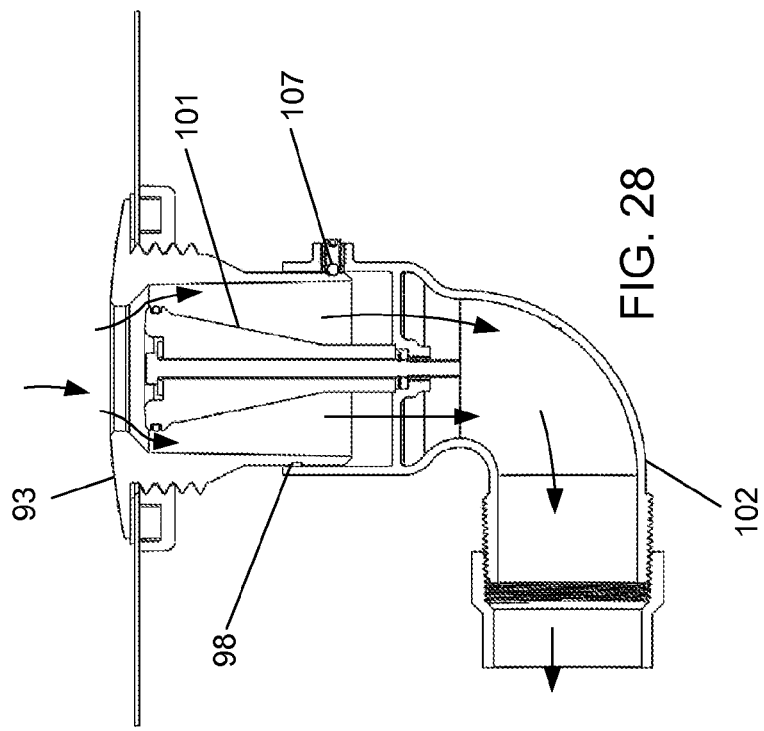
Figure 27:
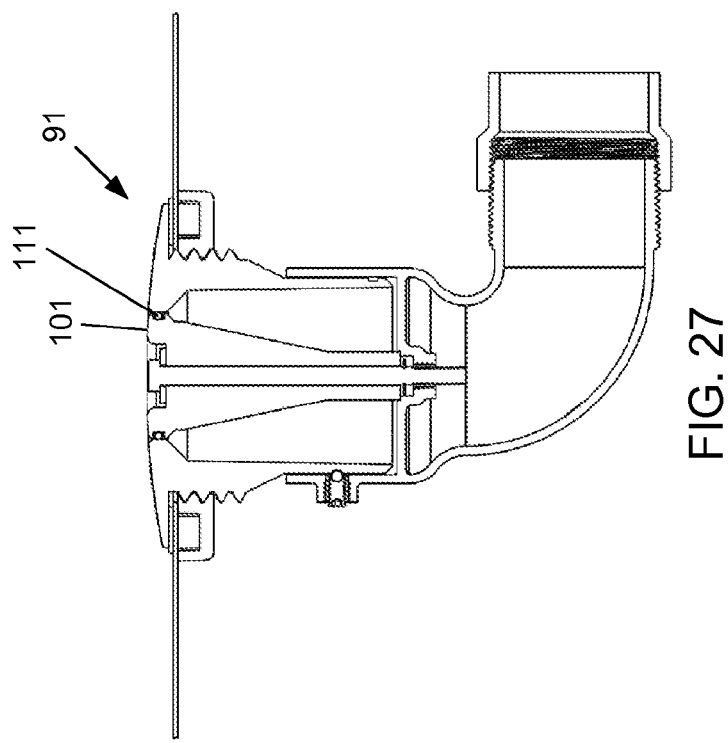

FIGS. 27 and 28 illustrate the operation of drainage system 91. To operate drainage system 91, the user turns elbow 102 either clockwise or counter clockwise. For example, FIG. 27 shows drainage system 91 in a closed position with drain plug 101 covering the opening of flange 93. Drain plug 101 includes O-ring 111. In FIG. 27, fluid is prevented from entering drainage system 91. In FIG. 28 the user has turned elbow 102. Ball bearing 107 travels along contoured track 98 causing elbow 102 to be lowered. As elbow 102 is lowered drain plug 101 is pulled downward and separates from the opening at the top of flange 93. Fluid is now permitted to flow through drainage system 91 as indicated by the arrows.

When drainage system 91 is not being utilized, flange 93 is preferably covered by lid 121 for protection (FIG. 21, FIG. 26). Lid 121 includes attachment ears 122 (FIGS. 21-22). Flange 93 includes flat section 123 (FIG. 20) that corresponds to attachment ears 122. To attach lid 121 onto flange 93, the user places lid 121 so that attachment ears 122 align with flat section 123. The user then twists lid 121 so that attachment ears 122 are under lip 124 of flange 93, thereby securing lid 121 to flange 93 to cover hole 125.

Figure 29:
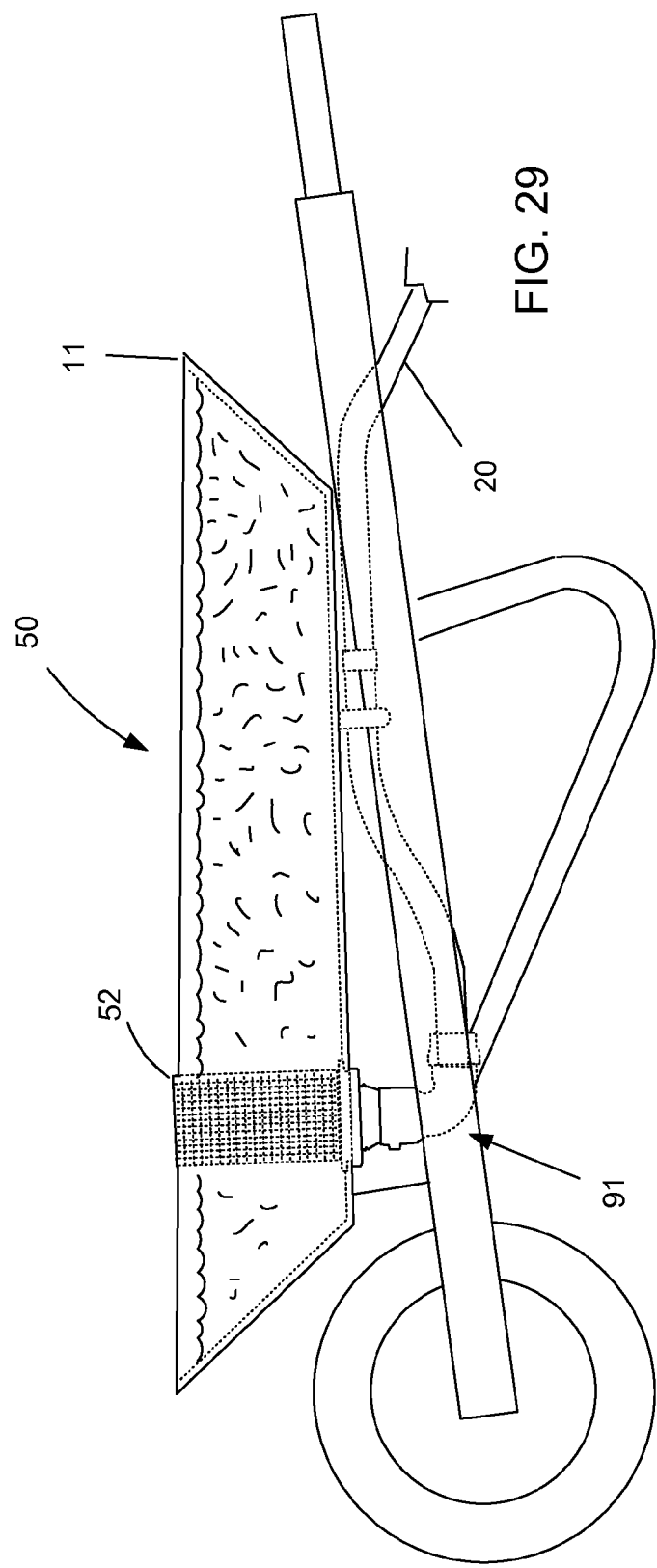

FIG. 29 shows drainage system 91 connected to tray 11 of wheelbarrow 50. As an option, the user may attach filter 52 to drainage system 91. Filter 52 may be attached using attachment ears 122 or filter 52 may be threaded onto drainage system 91.

Figure 30:
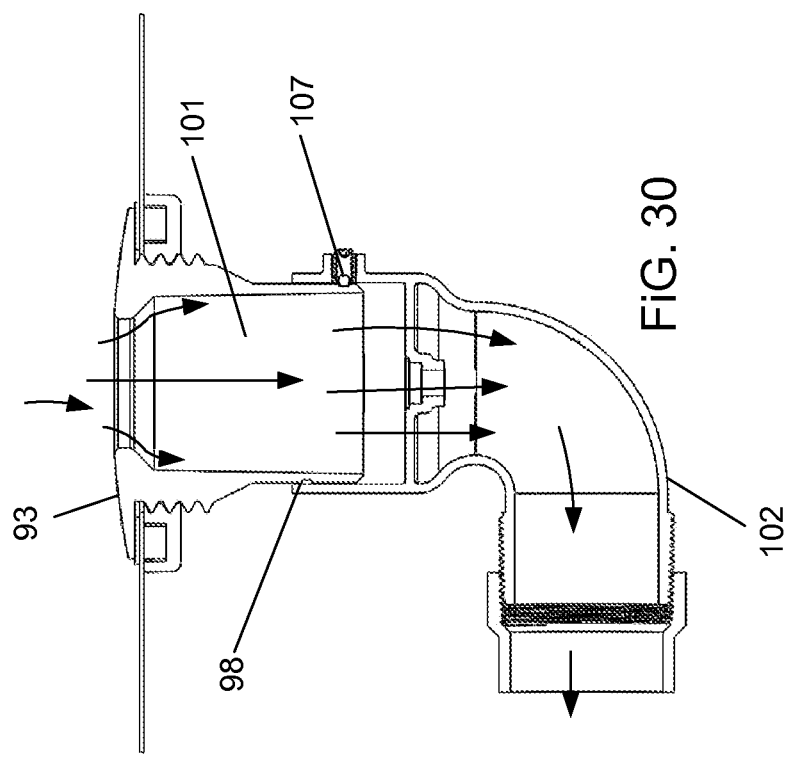

It should also be noted that if faster flow is needed then drain plug 101 may be removed to allow for a clearer flow of liquid through drain assembly 91 (FIG. 30).

While the present invention has been described in terms of preferred embodiments, the reader should consider these described embodiments only as particular embodiments. Many other embodiments are possible. For example, although the above preferred embodiments discussed utilizing the drainage systems for draining fluid from a wheelbarrow, the above described drainage systems may also be used to drain fluid from other types of containers. For example, in other preferred embodiments the above described drainage systems are used to drain fluid from a garbage can or dumpster. Therefore, the reader should determine the scope of the present invention by the claims and their legal equivalents.

What is claimed is:

1. A wheelbarrow with a drainage system, said wheelbarrow comprising:
   a. a tray having a predrilled drainage hole,
   b. a flange positioned over the predrilled hole, said flange comprising a contoured track and a flange opening,
   c. an elbow positioned under the predrilled hole and connected to said flange, wherein said elbow comprises:
      i. a ball bearing connected to said elbow and inserted into said contoured track,
      ii. a removable drain plug connected to said elbow and plugging said flange opening when said drainage system is in a closed position, and unplugging said flange opening when said drainage system is in an open position,
   wherein said drainage system is moved from said closed position to said open position by turning said elbow causing said ball bearing to move along said contoured track causing said drain plug to alternatingly plug and then unplug said flange opening.

2. The wheelbarrow as in claim 1, further comprising a filter connected to said flange, said filter for allowing fluid to drain from said wheelbarrow tray.

3. The wheelbarrow as in claim 2 wherein said filter is a circular wire mesh filter that extends upward to a level equal to or higher than the level of the fluid within said tray.

4. The wheelbarrow as in claim 1, further comprising a flange cap for attachment to said flange to prevent unwanted objects from passing through said flange.

5. The wheelbarrow as in claim 4, wherein said cap comprises attachment ears for attachment to said flange.

6. The wheelbarrow as in claim 5, further comprising an elbow cap for attachment to said elbow.

7. The wheelbarrow as in claim 6 further comprising a flexible hose connected to said elbow.

8. The wheelbarrow as in claim 7 further comprising:
   a. a pump connected to the discharge side of said flexible hose,
   b. a pump discharge hose connected to said pump,
   c. a fluid receptacle for receiving the fluid discharge from said pump discharge hose.

9. The wheelbarrow as in claim 1 further comprising a fluid receptacle device for receiving fluid discharge from said elbow.

* * * * *